(12) United States Patent
Li

(10) Patent No.: US 8,361,332 B2
(45) Date of Patent: *Jan. 29, 2013

(54) METHOD OF FORMING MICRO-LENSES

(75) Inventor: Jin Li, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 434 days.

This patent is subject to a terminal disclaimer.

(21) Appl. No.: 12/501,872

(22) Filed: Jul. 13, 2009

(65) Prior Publication Data

US 2009/0315201 A1    Dec. 24, 2009

Related U.S. Application Data

(63) Continuation of application No. 10/713,188, filed on Nov. 17, 2003, now Pat. No. 7,572,385.

(51) Int. Cl.
*B29D 11/00* (2006.01)
*C23F 1/02* (2006.01)

(52) U.S. Cl. ............... 216/26; 216/39; 216/57; 216/95; 216/96; 264/2.5

(58) Field of Classification Search .............. None
See application file for complete search history.

(56) References Cited

U.S. PATENT DOCUMENTS

| | | | |
|---|---|---|---|
| 4,610,502 A * | 9/1986 | Nicia et al. ............. 385/131 |
| 5,300,263 A | 4/1994 | Hoopman et al. |
| 5,575,962 A | 11/1996 | Takahashi |
| 5,708,493 A | 1/1998 | Ahsbahs et al. |
| 5,871,653 A | 2/1999 | Ling |
| 5,876,642 A | 3/1999 | Calderini et al. |
| 6,307,243 B1 | 10/2001 | Rhodes |
| 6,618,201 B2 | 9/2003 | Nishikawa et al. |
| 7,115,853 B2 | 10/2006 | Jiang et al. |
| 7,333,267 B2 | 2/2008 | Boettiger et al. |
| 2002/0084251 A1 * | 7/2002 | Ricks ............. 216/41 |
| 2006/0038112 A1 | 2/2006 | Jiang et al. |

FOREIGN PATENT DOCUMENTS

EP    1329432 A1    7/2003

* cited by examiner

*Primary Examiner* — Allan Olsen
(74) *Attorney, Agent, or Firm* — Dickstein Shapiro LLP

(57) ABSTRACT

A method of fabricating micro-lenses is provided. A first layer is formed on a substrate. The first layer is comprised of a first material and the substrate is comprised of a second material. An opening is formed in the first layer and an etchant is provided in the opening to etch both the substrate and the first layer to form a first mold for a first micro-lens. The etchant etches the first layer at a different rate than the substrate. A lens material is added to the etched molds to form micro-lenses.

20 Claims, 8 Drawing Sheets

FIG. 9A
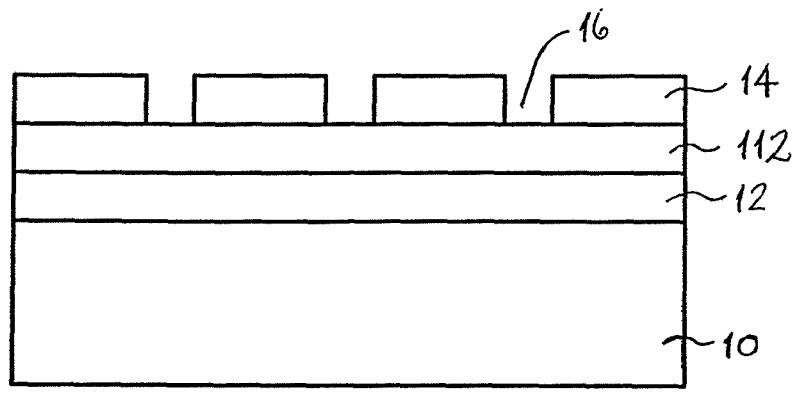
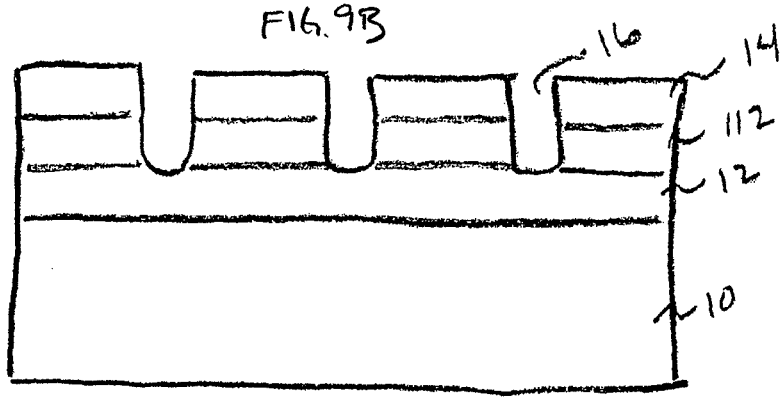
FIG. 9B
FIG. 9C
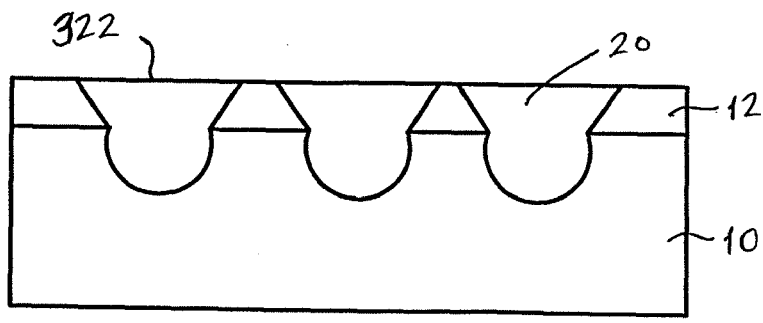

FIG. 10

Etch rates in Angstroms/minute

| MATERIAL | WET ETCHANT | | | |
|---|---|---|---|---|
| | BOE 20:1 | HF 10:1 | HF 100:1 | HF 25:1 |
| DARC Fuse Annealed | 1012 | ----- | 33 | 132 |
| BPSG (2.7/7.2) WJ RTP & Anneal | 362 | ----- | 242 | 992 |
| BPSG (3.0/6.0) WJ As Deposited | 700 | 10100 | 860 | 3440 |
| BPSG (3.0/6.0) WJ RTP & Anneal | 297 | 2190 | 210 | 840 |
| BPSG (3.0/7.6) Centura Densified | 480 | 278 | 1130 | 68 |
| BPSG (3.8/6.9) WJ RTP & Anneal | 250 | 2200 | 860 | 223 |
| PSG (6.9) As Deposited | 1240 | ----- | 708 | 4350 |
| HDP CVD Oxide As Deposited | 401 | 444 | 39 | 141.9 |
| HDP CVD Oxide Densified | 366 | 312 | 32 | 118.7 |
| Low Silane PECVD | 690 | 1080 | 118 | 472 |
| TEOS PECVD | 540 | 632 | 62 | 248 |
| TEOS PECVD Densified | 390 | 293 | 28 | 111 |

METHOD OF FORMING MICRO-LENSES

CROSS REFERENCE TO RELATED APPLICATIONS

The present application is a continuation of U.S. application Ser. No. 10/713,188, filed Nov. 17, 2003 now U.S. Pat. No. 7,572,385, the disclosure of which is herewith incorporated by reference in its entirety.

FIELD OF THE INVENTION

The present invention relates generally to the field of semiconductor devices and more particularly to micro-lenses utilized in imager devices or displays.

BACKGROUND

The semiconductor industry currently uses different types of semiconductor-based imagers, such as charge coupled devices (CCDs), CMOS active pixel sensors (APS), photodiode arrays, charge injection devices and hybrid focal plane arrays, among others, that use micro-lenses. Semiconductor-based displays using micro-lenses are also known.

It is desirable to maximize the amount of light received by the photo-conversion devices of an imager. One way to increase the light received by the photo-conversion devices is to increase the amount of light received by micro-lenses, which collect external light and focus it on the photo-conversion device. Another way is to enhance the positioning of the focal point of each micro-lens to ensure that much of the light received by the micro-lenses is focused on the photo-conversion devices.

In conventional micro-lens fabrication, photo-resist is reflowed to form micro-lenses having radii proportional to the pixel sizes. It is hard to form a small micro-lens while maintaining the appropriate focal length in conventional micro-lens fabrication. The smaller a micro-lens made through conventional processes is, the shorter the focal length becomes. Thus, it would be advantageous to form micro-lenses that are aspherical and have differently sized radii.

Micro-lenses may be formed through an additive process in which a lens material is formed on a substrate and subsequently formed into a shaped micro-lens. Micro-lenses also may be formed by a subtractive process. Known subtractive processes, however, are complex and manufacturing micro-lenses from such known processes is difficult.

SUMMARY

The present invention provides easily manufactured micro-lenses which can be used in an imager or display device. In one exemplary embodiment, a method of forming micro-lenses includes forming a first layer on a substrate. The first layer includes a first material and the substrate includes a second material. The method also includes forming openings in the first layer and providing an etchant in the openings to etch both the substrate and the first layer to prepare molds for micro-lenses. The etchant etches the first layer at a different rate than the substrate. The method further includes adding a lens material in the molds to form the micro-lenses.

In another exemplary embodiment, a method of forming micro-lenses includes forming a first layer on a substrate and forming a second layer on the first layer. The first layer comprises a first material, the substrate comprises a second material, and the second layer comprises a third material. The method also includes forming an opening in the second layer and the first layer, to the substrate, and providing an etchant in the opening to etch the substrate, second layer, and first layer to prepare molds for micro-lenses. The etchant etches the substrate at a different rate than the first layer, and etches the first layer at a different rate than the second layer. The method further includes adding a lens material in the molds to form the micro-lenses.

These and other features representative of various embodiments of the invention will be more readily understood from the following detailed description of the invention, which is provided in connection with the accompanying drawings.

BRIEF DESCRIPTION OF THE DRAWINGS

FIGS. 9A-9C illustrate the fabrication of a fourth aspect of the exemplary embodiment shown in FIG. 1.

FIG. 10 is a chart depicting etch rates of various exemplary materials using a variety of exemplary etchant materials.

DETAILED DESCRIPTION OF PREFERRED EMBODIMENTS

FIGS. 1-5 illustrate various processing steps in the fabrication of micro-lenses in accordance with an embodiment of the invention. A substrate 10 is provided with a layer 12 covering a top surface. The term "substrate" is to be understood as including a layer, which may be supported by a base semiconductor foundation, other semiconductor structures, other material layers, and/or devices. The substrate 10 is formed of a first material, such as, for example, tetraethyl orthosilicate (TEOS), which is reactive with certain etchants. The layer 12 is formed of a second material, such as, for example, Low silane formed by plasma enhanced chemical vapor deposition (Low silane PECVD), which is reactive with certain etchants.

Figure 1:
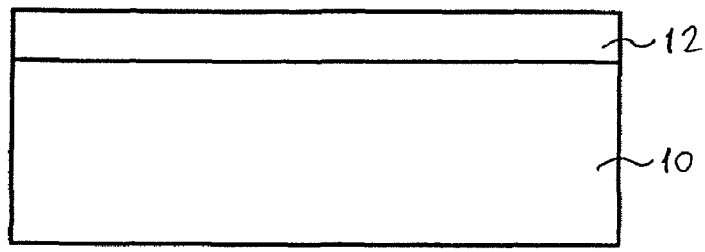
FIGS. 1-5 illustrate successive fabrication steps in the process of forming micro-lenses in accordance with an exemplary embodiment of the invention.
Figure 2:
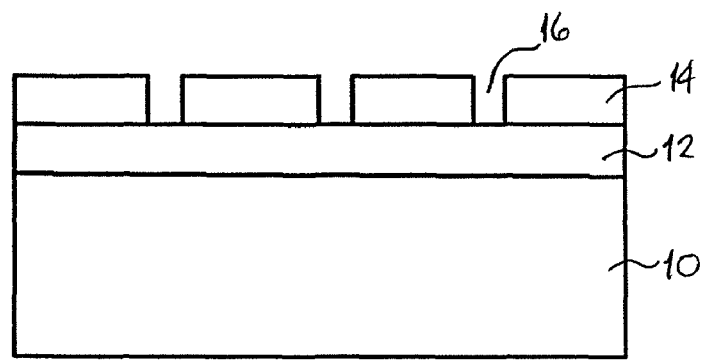
Figure 3:
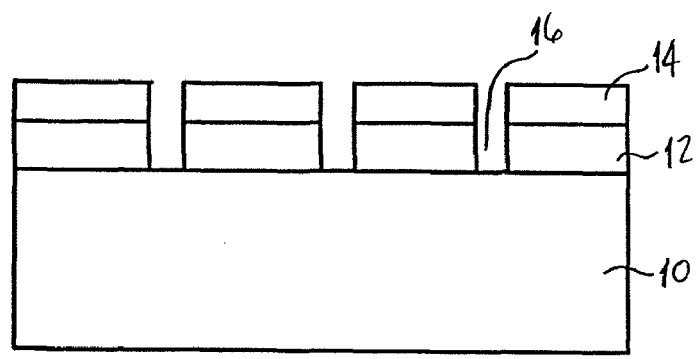
Figure 4:
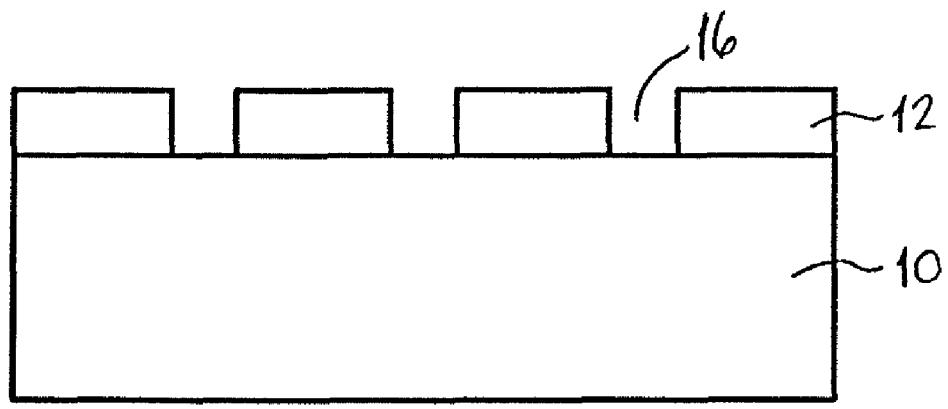

With specific reference to FIG. 2, a resist material 14 is deposited on the layer 12. Openings 16 are formed in the resist material 14 at desired positions over substrate 10. The position of openings 16 determines the subsequent position of micro-lenses. Thus, openings 16 can be positioned to achieve desired placements of micro-lenses. The openings 16 are patterned and resist material 14 is removed to form the openings 16. As shown in FIG. 3, the openings 16 are used as a template and an etchant is introduced to extend the openings 16 through the layer 12 to the surface of the substrate 10. Illustratively, the etchant used to extend the openings 16 through the layer 12 to the surface of the substrate 10 is a dry etchant, but any suitable etchant can be used. Finally, as shown in FIG. 4, the resist material 14 is removed, leaving the openings 16 within the layer 12.

Figure 5:
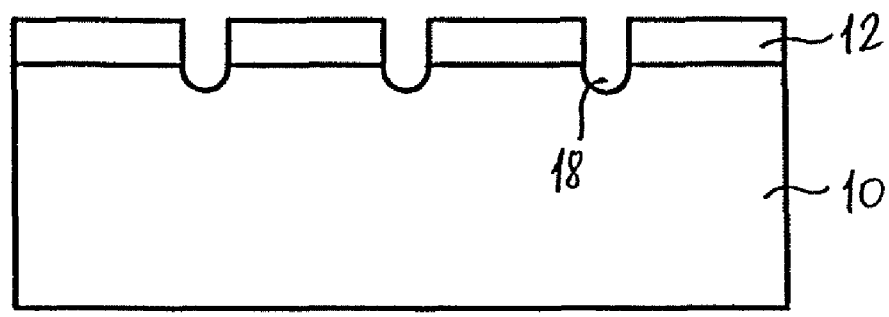

As shown in FIG. 5, recessed areas 18 are etched into the substrate 10 at the base of the openings 16. The recessed areas 18 are formed by an etchant, for example, a wet etchant, which is reactive with the substrate 10. The wet etchant, which is deposited over the layer 12 and within the recessed areas 18, also reduces the thickness of the layer 12, which serves as an etch mask.

The particular etchant chosen to etch the recessed areas 18 and the materials forming the substrate 10 and the layer 12 are chosen such that the etchant etches through the substrate 10 at a different rate than the rate at which it etches through the layer 12. Illustratively, the etchant and materials are chosen such that the etchant etches the material of layer 12 at a higher rate than the rate at which it etches the material of substrate 10. The particular etch rate ratio of layer 12 to substrate 10 is chosen to achieve desired dimensions for micro-lens molds formed in the substrate 10, and therefore, desired dimensions for subsequently formed micro-lenses. As the focal length of a micro-lens is dependent on the dimensions, e.g., radius, of the micro-lens, a desired focal length can also be achieved by choosing a particular etch rate ratio. Also, by forming a micro-lens mold to which a micro lens material can by added, inorganic micro-lenses can be formed instead of organic micro-lenses. Formation of micro-lens molds and micro-lenses is described in more detail below in connection with FIGS. 6A-9C.

FIG. 10 is a chart showing the rates at which exemplary suitable materials are etched by exemplary suitable etchants. It should be noted that FIG. 10 is not an exhaustive listing of all suitable materials or suitable etchants. Suitable materials can include materials from the following classes of materials: glasses, oxides, silicon nitrides, and dielectric anti-reflective coatings (DARC). For purposes of this description, one material can be a "different material" from another where the materials are of a same material type, but formed are differently.

As is known in the art, the way in which a material is formed can affect the rate at which a particular etchant will etch the material. For example, as shown in FIG. 10, a boro-phosphosilicate glass (BPSG), which is about 2.7 percent boron by weight and 7.2 percent phosphorus by weight, material deposited in a Watkins-Johnson machine (WJ) using a rapid temperature process (RTP) and anneal is etched at a rate of about 242 Angstroms/minute (Å/min) by a solution of one percent by volume hydrogen fluoride in distilled water (HF 100:1), whereas a BPSG densified material, which is about 3.0 percent boron by weight and 7.6 percent phosphorus by weight, deposited in a Centura machine is etched by the same etchant at a rate of 1130 Å/min. Thus, a BPSG (2.7/7.2) WJ RTP and anneal material is different than a BSPG (3.0/7.6) Centura densified material. For simplicity, the weight percents of boron and phorphorus in a BPSG material are indicated herein by the following notation: (weight percent boron/weight percent phosphorus).

As noted above, materials listed in the FIG. 10 chart, as well as other materials, can be used as substrate 10 and/or layer 12 to achieve a desired layer 12 to substrate 10 etch rate ratio using a particular etchant. The greater the etch rate of the material of layer 12 as compared to the etch rate of the material for substrate 10, the more shallow the resulting lens-molds and micro-lenses will be. Therefore, a material and etchant combination providing a 5:1 layer 12 to substrate 10 etch rate ratio will yield a shallower lens-mold than a material and etchant combination providing a 2:1 layer 12 to substrate 10 etch rate ratio.

Figure 6A:
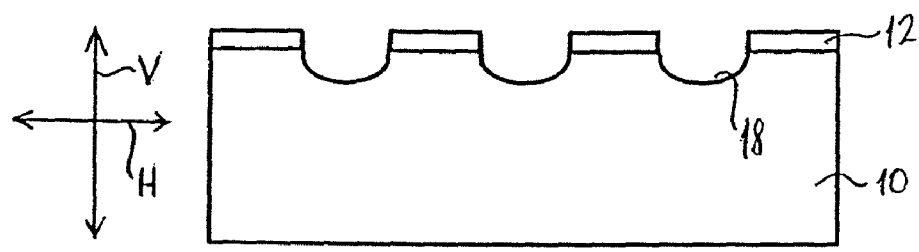
FIGS. 6A-6D illustrate additional fabrication steps for one aspect of the exemplary embodiment shown in FIG. 1.
Figure 6B:
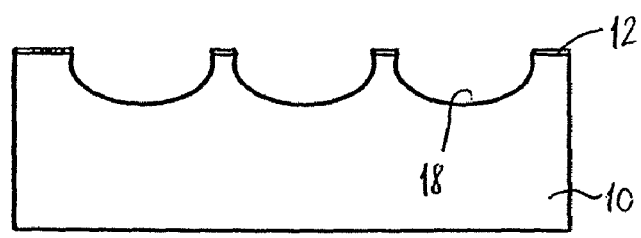

FIGS. 6A-6D depict the substrate 10 in various stages of etch. The wet etchant used to etch the recessed areas 18 has etched the areas 18 into the substrate 10 and widened the areas 18 in the layer 12. As etching progresses, the thickness of the layer 12 continues to be reduced by the wet etchant. The wet etchant used to etch the areas 18 in FIGS. 6A-6C etches the layer 12 at a higher rate than the substrate 10, such that, for example, there is about a 3:1 layer 12 to substrate 10 etch rate ratio. Thus, the direction of etch is greater in the horizontal H direction than in the vertical V direction (FIG. 6A).

Referring to FIG. 10, to achieve about a 3:1 etch rate ratio a hydrogen fluoride formulation of about ten percent by volume hydrogen fluoride in distilled water (HF 10:1) etches a plasma enhanced chemical vapor deposited (PECVD) Low Silane material layer 12 at a rate of about 1080 Å/min, and a Tetraethylorthosilicate (TEOS) PECVD densified material substrate 10 at a rate of about 293 Å/min. Alternatively, the following etchant and material combinations can be used: layer 12 can be Low Silane PECVD, substrate 10 can be any one of high density plasma chemical vapor deposited (HDP CVD) Oxide as deposited, HDP CVD Oxide densified, or fuse annealed dielectric antireflective coating (DARC), and the etchant can be about one percent hydrogen fluoride in distilled water (HF 100:1); layer 12 can be phosphosilicate glass with 6.9 percent phosphorus by weight (PSG (6.9)), substrate 10 can be HDP CVD Oxide as deposited, and the etchant can be a buffered oxide etch (BOE) 20:1, which is a buffered solution of about five percent hydrogen fluoride by volume in distilled water; layer 12 can be a DARC fuse annealed material, substrate 10 can be HDP CVD Oxide densified, and the etchant can be a buffered oxide etch (BOE) 20:1; or layer 12 can be BPSG (3.8/6.9) WJ RTP and anneal, substrate 10 can be BPSG (3.0/7.6) Centura densified, and the etchant can be about four percent hydrogen fluoride in distilled water (HF 25:1).

Figure 6C:
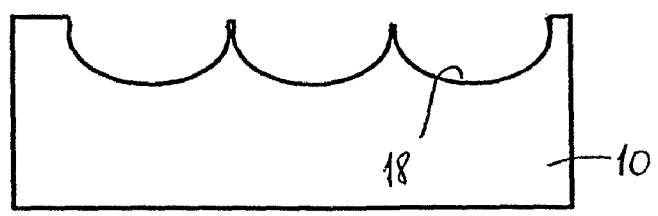
Figure 6D:
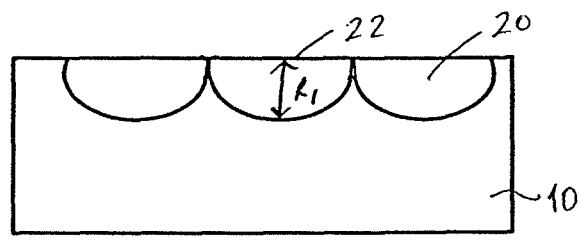

Once the areas 18 have a desired radius, corresponding to the desired radius of the micro-lenses, the etched openings in substrate 10 can be used as a micro-lens mold 18. Where etch rates are known, achievement of the desired radius $R_1$ (FIG. 6D) can be determined by the amount of time the etchant has etched the substrate 10 and layer 12. For example, where the desired micro-lens radius is represented by the structure of FIG. 6C, the wet etchant is removed and a lens material 20 is deposited into the areas 18 to form micro-lenses 22, as shown in FIG. 6D. The lens material 22 can be any suitable material as is known in the art. Illustratively, in the embodiments of the invention described herein, the lens material 22 has a higher refraction index than the refraction index of the substrate 10. Also, material 22 can be an inorganic material.

A chemical mechanical polish (CMP) step can be conducted to planarize the surfaces of micro-lenses 22, as shown in FIG. 6D, to provide a flat top surface, which is easy to handle in later processing steps. Later processing steps can be conventional processing steps conducted to complete the device of which the micro-lenses 22 are a part. Such additional processing steps can be conducted for the other exemplary embodiments described herein.

Figure 7A:
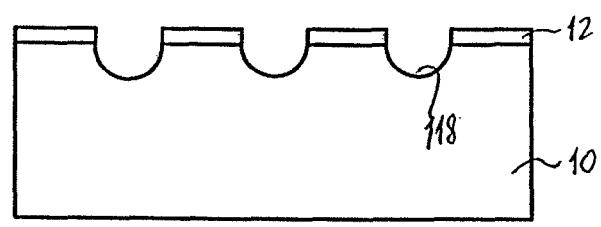
FIGS. 7A-7D illustrate additional fabrication steps for a second aspect of the exemplary embodiment shown in FIG. 1.
Figure 7B:
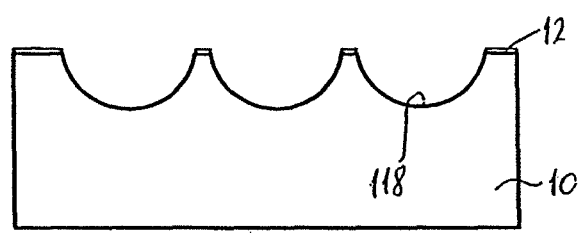
Figure 7C:
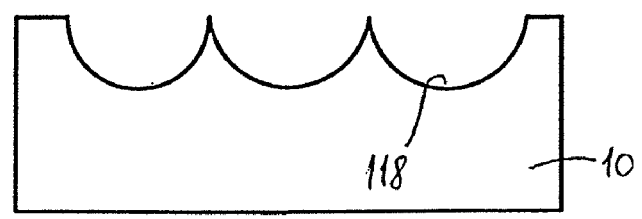
Figure 7D:
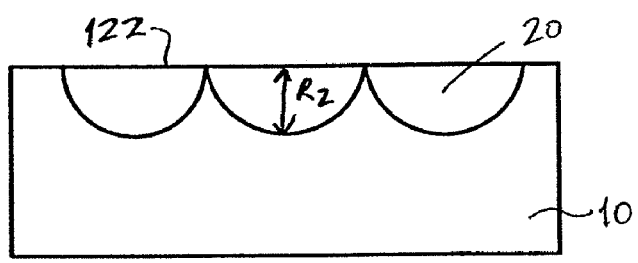

FIGS. 7A-7D show the substrate 10 in various stages of etch under a different layer 12 to substrate 10 etch rate ratio than the etch rate ratio of FIGS. 6A-6D. Similar to the example of FIGS. 6A-6D, the wet etchant used to etch recessed areas 118 in FIGS. 7A-7C has a higher rate of etch of the deposition material 12 than of the substrate 10. In the example of FIGS. 7A-7D, however, there is, for example, about a 2:1 layer 12 to substrate 10 etch rate ratio. The result is a more uniform rate of etch between the material of layer 12 and the material of substrate 10, and thus a more uniform direction of etch between the horizontal and vertical directions. Therefore, different dimensions, e.g., radius $R_2$ (FIG. 7D), for the recessed areas 118 can be achieved. Once the desired radius $R_2$ of the micro-lenses has been etched into the substrate 10 forming a micro-lens mold, the wet etchant is removed and a lens material 20 is deposited into the areas 118 to form micro-lenses 122. A CMP step is conducted to planarize the surfaces of the micro-lenses 122, as shown in FIG. 7D.

Referring to FIG. 10, to achieve about a 2:1 layer 12 to substrate 10 etch rate ratio, about four percent by volume hydrogen fluoride in distilled water (HF 25:1) can be used to etch a Low Silane PECVD material layer 12 and a TEOS PECVD material substrate 10. Alternatively, layer 12 can be BPSG (3.8/6.9) WJ RTP and anneal, substrate 10 can be Low Silane PECVD, and the etchant can be HF 10:1; layer 12 can be TEOS PECVD, substrate 10 can be fuse annealed DARC, and the etchant can be HF 100:1 or HF 25:1; layer 12 can be TEOS PECVD, substrate 10 can be BPSG (3.8/6.9) WJ RTP and anneal, and the etchant can be BOE 20:1; or layer 12 can be TEOS PECVD, substrate 10 can be HDP CVD Oxide as deposited or HDP CVD Oxide densified, and the etchant can be HF 100:1 or HF 25:1.

Figure 8A:
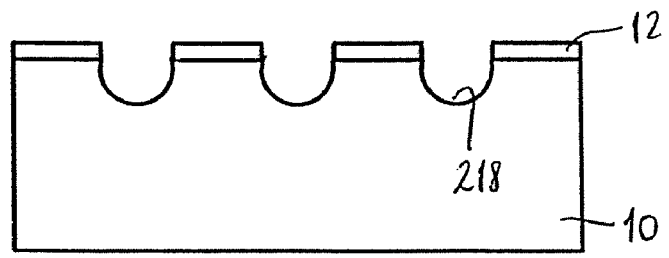
FIGS. 8A-8D illustrate additional fabrication steps for a third aspect of the exemplary embodiment shown in FIG. 1.
Figure 8B:
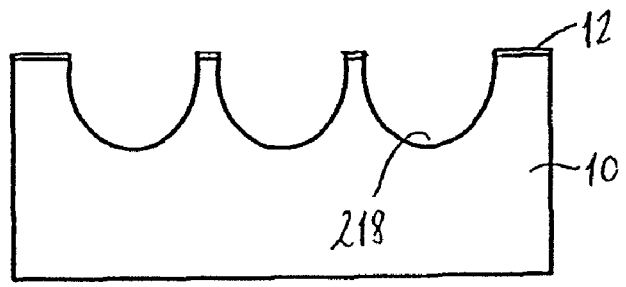
Figure 8C:
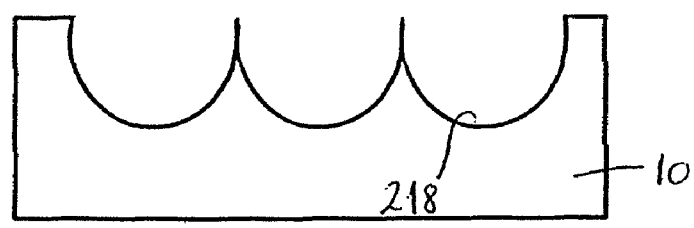
Figure 8D:
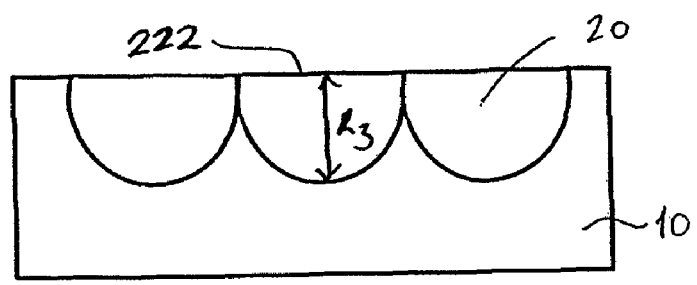

FIGS. 8A-8D show the substrate 10 in various stages of etch under a different layer 12 to substrate 10 etch rate ratio than the etch rate ratio of FIGS. 6A-7D. Similar to the example of FIGS. 6A-7D, the wet etchant used to etch recessed areas 218 in FIGS. 8A-8D has a higher rate of etch of the deposition material 12 than of the substrate 10. In the example of FIGS. 8A-8D, however, there is, for example, about a 1.5:1 layer 12 to substrate 10 etch rate ratio. The result is a more uniform rate of etch between the material of layer 12 and the material of substrate 10, and thus a more uniform direction of etch between the horizontal and vertical directions. Therefore, a different shape and radii $R_3$ for the recessed areas 218 can be achieved. As with FIGS. 6D and 7D, once the desired radii $R_3$ (FIG. 8D) of the micro-lenses has been etched into the substrate 10, forming a micro-lens mold, the wet etchant is removed and a lens material 20 is deposited into the areas 218 to form micro-lenses 222. A CMP step is conducted to planarize the surfaces of micro-lenses 222, as shown in FIG. 8D.

Referring to FIG. 10, to achieve about a 1.5:1 layer 12 to substrate 10 etch rate ratio the layer 12 can be fuse annealed DARC, substrate 10 can be BPSG (3.0/6.0) WJ as deposited, and the etchant can be buffered oxide etchant (BOE) 20:1. Alternatively, the following material and etchant combinations can be used: layer 12 can be Low Silane PECVD, substrate 10 can be TEOS PECVD, and the etchant can be HF 100:1; layer 12 can be fuse annealed DARC, substrate 10 can be Low Silane PECVD, and the etchant can be buffered oxide etchant (BOE) 20:1; layer 12 can be HDP CVD Oxide as deposited, substrate 10 can be TEOS PECVD densified, and the etchant can be HF 10:1; or layer 12 can be BPSG (3.8/6.9) WJ RTP and anneal, substrate 10 can be HDP CVD Oxide as deposited, and the etchant can be HF 25:1.

Although the above described embodiments are shown having particular etch rate ratios of an upper layer 12 to a lower substrate 20, the invention is not limited to such etch rate ratios. Accordingly, additional combinations of materials and etchant can be used to achieve different etch ratios and the resulting micro-lenses as are desired. For example, combinations of materials and etchant can be used to achieve a 5:1 layer 12 to substrate 10 etch rate ratio. In such a case, the following material and etchant combinations can be used: layer 12 can be BPSG (3.8/6.9) WJ RTP and anneal, substrate 10 can be HDP CVD Oxide as deposited, and the etchant can be HF 10:1; or layer 12 can be PSG (6.9) as deposited, substrate 10 can be BPSG (3.8/6.9) WJ RTP and anneal, and the etchant can be BOE 20:1.

Next, a method for forming micro-lenses having more complex aspherical shape is described with reference to FIGS. 9A-9C. The layer 12 is first formed on the substrate 10, as described above in connection with FIG. 1. However, prior to the deposition of the resist material 14, one or more additional layers, collectively referred to as second layer 112, are deposited on the first layer 12. The resist material 14 is then deposited and patterned on the layer 112 to form openings 16. After using a dry etchant to form recessed areas extending to the first layer 12 (FIG. 9B), a wet etchant is used to form molds for micro-lenses. The materials forming the second layer 112 and the first layer 12 are chosen to react differently to a specific wet etchant. Thus, the wet etchant etches the second layer 112 at a different rate than the first layer 12, resulting in complex, aspherical molds. The molds are filled with the lens material 20 to form micro-lenses 322, as shown in FIG. 9C, and a CMP step is conducted to planarize the surfaces of micro-lenses 322.

Examples of etchant and material combinations for the exemplary embodiment of FIGS. 9A-9C are now provided. Using a wet etchant of about ten percent hydrogen fluoride by volume in distilled water (HF 10:1), layer 12 can be a layer of Low Silane PECVD, the second layer 112 can be a layer of BPSG (3.8/6.9) WJ RTP and anneal or BPSG (3.0/6.0) WJ RTP and anneal, and the substrate 10 can be TEOS PECVD densified. Using a wet etchant of about four percent hydrogen fluoride by volume in distilled water (HF 25:1), layer 12 can be a layer of Low Silane PECVD, the second layer 112 can be a layer of BSPG (2.7/7.2) WJ RTP and anneal, and the substrate can be TEOS PECVD. Also, using a wet etchant of about one percent hydrogen fluoride by volume in distilled water (HF 100:1), layer 12 can be a layer of Low Silane PECVD; the second layer 112 can be a layer of BPSG (2.7/7.2) WJ RTP and anneal or BPSG (3.0/6.0) WJ RTP and anneal; and the substrate 10 can be TEOS PECVD.

Although specific examples of material and etchant combinations have been provided, the invention is not limited to these specific embodiments. Accordingly, the invention can be practiced using other material and etchant combinations. While the invention has been described in detail in connection with exemplary embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A method of forming a light focal device, the method comprising:
   providing a substrate;
   forming a first layer on the substrate;
   forming a first opening in the first layer using a dry etchant;
   providing a wet etchant in the first opening to etch both the substrate and the first layer to form a first mold for the light focal device, wherein the wet etchant etches the first layer at a different rate than the substrate; and
   adding a transparent material in the first mold to form the light focal device.

2. The method of claim 1, wherein the first layer is a material selected from the group consisting of Silane PECVD, fuse annealed dielectric antireflective coating, borophosphosilicate glass (3.8/6.9) WJ RTP, phosphosilicate glass (6.9) as deposited, and fuse annealed DARC, HDP CVD oxide as deposited;
   wherein the substrate is a material selected from the group consisting of TEOS, TEOS PECVD densified, HDP CVD oxide densified, borophosilicate glass (3.0/7.6) centura densified, HDP CVD oxide as deposited, and fuse annealed dielectric antireflective coating; and
wherein the wet etchant is between about one percent to about ten percent hydrogen fluoride by volume in distilled water.

3. The method of claim 1, wherein the wet etchant etches the first layer at a greater rate than the substrate.

4. The method of claim 1, wherein the etch rate ratio of the first layer to the substrate is between about 1.5:1 to about 5:1.

5. The method of claim 1, further comprising forming at least a second layer on the first layer and forming the first opening through the first layer and the second layer, wherein the wet etchant etches the second layer at a different rate than the first layer.

6. The method of claim 1, wherein forming the first opening in the first layer comprises:
depositing a resist material on the first layer;
patterning the first opening in the resist material to the first layer;
etching the first layer to extend the first opening to the substrate; and
removing the resist material.

7. The method of claim 6, wherein the first layer is etched to extend the first opening into the substrate.

8. A method of forming a mold, the method comprising:
forming a first layer on a substrate;
forming at least a second layer on the first layer;
forming a first opening in the second layer using an anisotropic first etchant; and
providing a second etchant in the first opening to etch the substrate, the first layer, and the second layer to form the mold, wherein the second etchant etches the first layer at a greater rate than the substrate, and wherein the second etchant etches the second layer at a greater rate than the first layer.

9. The method of claim 8, wherein providing the second etchant comprises providing a wet etchant and using the first etchant comprises providing a dry etchant.

10. The method of claim 8, further comprising forming the first opening in the second layer, the first layer, and the substrate using the first etchant.

11. A method of forming a mold, comprising:
forming a first layer on a substrate, the first layer comprised of a first material and the substrate comprised of a second material;
forming at least one second layer on the first layer, the at least one second layer comprised of a third material;
forming an opening in the first and at least one second layers by an anisotropic first etching; and
providing a second etchant in the opening to etch the substrate, the first layer, and the at least one second layer to form a mold for a micro-lens.

12. The method of claim 11, wherein providing the second etchant comprises providing a wet etchant and using the first etchant comprises providing a dry etchant.

13. The method of claim 11, wherein forming the opening in the first and at least one second layers comprises:
depositing a resist material on the second material;
patterning opening in the resist material;
dry etching the first and at least one second layers to extend the opening to the substrate; and
removing the resist material.

14. A method of forming a mold, the method comprising:
forming a first layer on a substrate, the first layer comprised of a first material and the substrate comprised of a second material;
forming a first opening in the first layer using a first etchant, the first opening having sidewalls substantially perpendicular to the surface of the first layer; and
providing a second etchant in the first opening to etch both the substrate and the first layer to form the mold, wherein the second etchant etches the first layer at a different rate than the substrate.

15. The method of claim 14, wherein the second etchant is a wet etchant and the first etchant is a dry etchant.

16. The method of claim 14, wherein forming the first opening in the first layer comprises:
depositing a resist material on the first layer;
patterning openings in the resist material to the first layer;
etching the first layer to extend the openings to the substrate; and
removing the resist material.

17. The method of claim 14, wherein the second etchant etches the first layer at a greater rate than the substrate.

18. The method of claim 14, further comprising:
forming at least a second layer on the first layer, the second layer comprising a third material, wherein the second etchant etches the second layer at a different rate than the first layer, and
forming the first opening in the first layer and the second layer.

19. The method of claim 14, wherein the first layer is a material selected from the group consisting of Silane PECVD, fuse annealed dielectric antireflective coating, borophosphosilicate glass (3.8/6.9) WJ RTP, phosphosilicate glass (6.9) as deposited, and fuse annealed DARC, HDP CVD oxide as deposited;
wherein the substrate is a material selected from the group consisting of TEOS, TEOS PECVD densified, HDP CVD oxide densified, borophosphosilicate glass (3.0/7.6) centura densified, HDP CVD oxide as deposited, and fuse annealed dielectric antireflective coating; and
wherein the wet etchant is between about one percent to about ten percent hydrogen fluoride by volume in distilled water.

20. The method of claim 14, wherein the etch rate ratio of the first layer to the substrate is between about 1.5:1 to about 5:1.

* * * * *